Patented July 6, 1926.

1,591,842

UNITED STATES PATENT OFFICE.

FRIEDRICH KERSCHBAUM, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

METHOD OF REDUCING THE INFLAMMABILITY AND EXPLOSIVENESS OF HYDROCYANIC ACID.

No Drawing. Application filed December 23, 1925, Serial No. 77,384, and in Germany December 27, 1924.

The object of this invention is to provide a means for stabilizing liquid hydrocyanic acid against explosion and to reduce its inflammability. I have found that the desired result may be obtained if the hydrocyanic acid is mixed with liquids which absorb heat on decomposition or polymerization of the liquid hydrocyanic acid and which can be vaporized without decomposition. The liquids to be used should preferably be fairly volatile and readily mix the hydrocyanic acid so that they will be vaporized along with the hydrocyanic acid. A further use can be made of these liquids if they themselves are, for example, insecticides. Liquids which I have found suitable for the stabilization are tetrachlorethylene, trichlorethylene and the like. The amount of these liquids to be added to the hydrocyanic acid and the particular liquid to be used depends on the degree of stabilization desired. For the prevention of explosion of liquid hydrocyanic acid a much smaller amount is sufficient than is necessary for reducing its inflammability.

Thus, for example, if I add 50 cc. of tetrachlorethylene to a liter of hydrocyanic acid I secure a very considerable reduction of the explosibility of the liquid hydrocyanic acid whilst about 3 times as much will prevent the ignition when the mixture is touched with a match.

What I claim is:

1. Method for reducing the inflammability and explosiveness of hydrocyanic acid which consists in mixing a volatile non-inflammable liquid with the hydrocyanic acid.

2. Method for reducing the inflammability and explosiveness of hydrocyanic acid which consists in mixing tetrachlorethylene with the hydrocyanic acid.

3. A product of manufacture consisting in hydrocyanic acid mixed with a volatile non-inflammable liquid.

4. A product of manufacture consisting in hydrocyanic acid mixed with tetrachlorethylene.

Signed at Frankfort A/M. Germany, this 5th day of December A. D. 1925.

FRIEDRICH KERSCHBAUM.